(12) United States Patent
Piwonka

(10) Patent No.: US 8,402,996 B2
(45) Date of Patent: Mar. 26, 2013

(54) ADJUSTABLE CHOKE FOR OIL AND GAS INDUSTRY

(75) Inventor: Marvin G. Piwonka, Katy, TX (US)

(73) Assignee: T-3 Property Holdings, Inc., Houston, TX (US)

( * ) Notice: Subject to any disclaimer, the term of this patent is extended or adjusted under 35 U.S.C. 154(b) by 154 days.

(21) Appl. No.: 13/095,962

(22) Filed: Apr. 28, 2011

(65) Prior Publication Data

US 2011/0266478 A1 Nov. 3, 2011

Related U.S. Application Data

(60) Provisional application No. 61/329,472, filed on Apr. 29, 2010.

(51) Int. Cl.
*F16K 31/44* (2006.01)

(52) U.S. Cl. ........ 137/553; 251/121; 251/214; 251/229; 251/249.5

(58) Field of Classification Search .......... 251/120–121, 251/249.5, 229, 214; 74/724; 137/315.02, 137/553
See application file for complete search history.

(56) References Cited

U.S. PATENT DOCUMENTS

| 2,628,638 | A | * | 2/1953 | Herod et al. ................ 251/229 |
| 3,505,888 | A | * | 4/1970 | Denkowski ............ 251/129.11 |
| 4,194,718 | A | | 3/1980 | Baker et al. |
| 4,346,728 | A | * | 8/1982 | Sulzer .................... 137/243.6 |
| 4,461,450 | A | * | 7/1984 | Soland et al. .............. 251/63.5 |
| 4,493,336 | A | * | 1/1985 | Renfro .................... 251/122 |
| 4,771,807 | A | * | 9/1988 | Karani .................... 137/553 |
| 5,241,980 | A | | 9/1993 | Corte |
| 6,145,538 | A | * | 11/2000 | Park .................... 137/554 |
| 6,585,227 | B2 | | 7/2003 | Newport et al. |
| 6,883,614 | B2 | * | 4/2005 | Schmidt et al. ............ 251/214 |
| 7,124,770 | B2 | * | 10/2006 | Schmidt et al. ............ 251/282 |
| 7,287,739 | B2 | | 10/2007 | Arnison et al. |

* cited by examiner

*Primary Examiner* — John Bastianelli
(74) *Attorney, Agent, or Firm* — Locke Lord LLP

(57) ABSTRACT

The disclosure provides a choke with an actuator that contains various components within an actuator housing to adjust the choke, and the housing is configured to be fixedly attached with a relatively large shearing connection on an actuator adapter to resist large overpressure surges within the housing and around the components. The actuator further includes a thrust bearing mounted adjacent a shoulder in the housing and supporting a worm gear, so that any overpressure loads are directed to the shoulder of the housing and retained within the housing while the housing is retained by the shearing connection to the remainder of the choke.

5 Claims, 6 Drawing Sheets

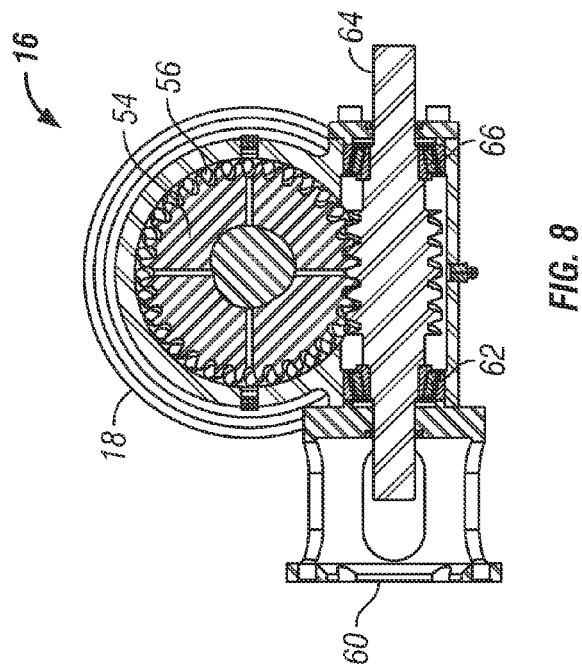
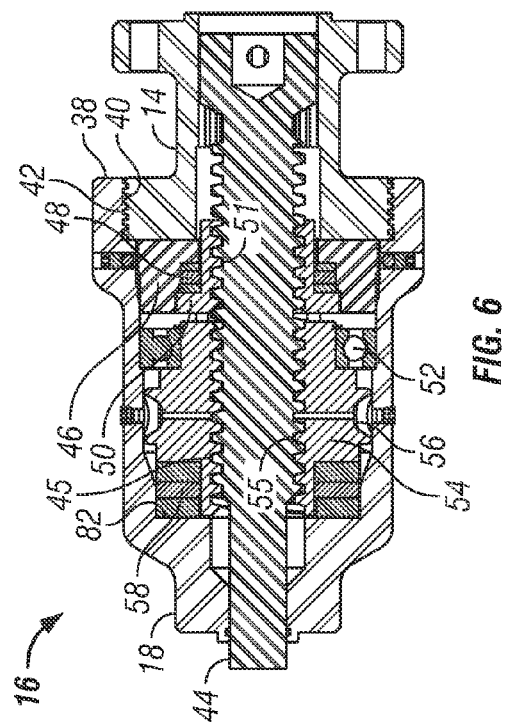
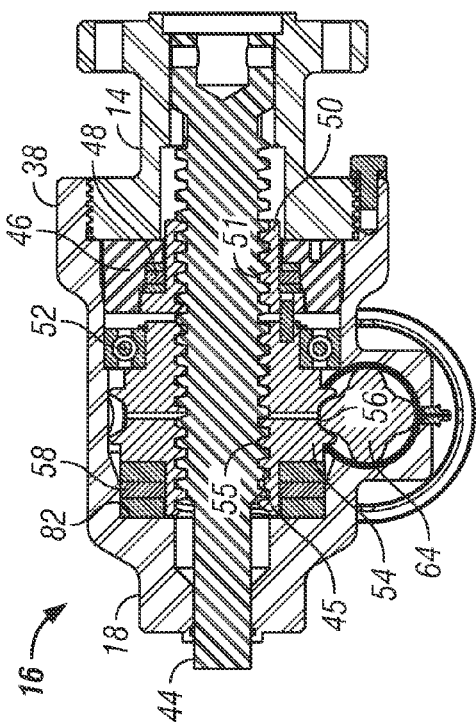

US 8,402,996 B2

ADJUSTABLE CHOKE FOR OIL AND GAS INDUSTRY

CROSS REFERENCE TO RELATED APPLICATIONS

This application claims the benefit of U.S. Provisional Application No. 61/329,472, filed Apr. 29, 2010.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The disclosure generally relates to the oil and gas industry. More particularly, the disclosure relates to chokes for the oil and gas industry.

2. Description of the Related Art

A type of flow control known in the oil and gas industry as a "choke" adjustably controls a through-flow of production fluids in pipes and other tubing. Chokes are typically located in proximity to a well to control production fluids from the well. Manually adjustable chokes have been used for decades, and typically have an adjustable hand wheel that can rotate a threaded shaft and move a tapered stem in and out of a choke seat to vary the available flow area and thus the flow.

One of the sources of overpressure conditions in a choke is caused by field use of the choke in unintended ways. The typical choke is not designed or intended to operate as a closing valve. However, field crews can and do entirely close the choke with the stem (or a plug coupled to the stem) against the seat. The force required to linearly close the stem against the seat can break the stem, rendering the choke useless until repaired. Some manufacturers include a shear pin at some position along the stem, so that the shear pin breaks before the stem, but still renders the choke useless until repaired.

As the industry progressed, motors, typically hydraulic motors, began to actuate chokes. One of the challenges in the motor actuated chokes is the ability to move the threaded stem (or a threaded shaft coupled to the stem) and then lock the stem into position, so that an overpressure burst of production fluid does not change the position of the stem relative to the seat. One improvement in the industry is attaching a worm gear transverse to a threaded shaft that is coupled to the stem to help hold the stem in position, but such improvement has only been partially successful, and some chokes can fail with overpressure conditions. When the choke is used undesirably as a closing valve, sometimes downstream pressure can surge unintentionally and cause backpressure in the choke components exposed to the downstream pressure. The construction in the downstream components results in a much larger square area than the upstream pressure area between the stem and seat. The pressure on the downstream components applied over the larger pressure area creates a much larger force than would have occurred on the upstream components with the smaller square area, and the choke can fail, internally and externally, and even break apart.

Thus, there remains a need for providing a design for a choke with an improved actuator assembly.

BRIEF SUMMARY OF THE INVENTION

The disclosure provides a choke with an actuator that contains various components within an actuator housing to adjust the choke, and the housing is configured to be fixedly attached with a relatively large shearing connection on an actuator adapter to resist large overpressure surges within the housing and around the components. The actuator further includes a thrust bearing mounted adjacent a shoulder in the housing and supporting a worm gear, so that any overpressure loads are directed to the shoulder of the housing and retained within the housing while the housing is retained by the shearing connection to the remainder of the choke.

The disclosure provides a choke for the oil and gas industry, comprising: a choke housing comprising an inlet and an outlet, and a seat disposed therein fluidly coupled to the inlet and the outlet; a bonnet nut coupled to the choke housing; an actuator adapter coupled to the bonnet nut; an actuator coupled to the actuator adapter, the actuator comprising an actuator housing; a lift shaft coupled to the actuator housing, the lift shaft having threads formed thereon; a worm gear coupled to the actuator housing and having inner threads and outer teeth, the inner threads configured to engage the lift shaft threads; a worm shaft coupled transverse to the worm gear, the worm shaft having threads configured to engage and turn the outer teeth of the worm gear; and the choke being configured to axially move the lift shaft with the worm shaft and vary a location of a trim plug relative to the seat to adjust a flow through the choke; wherein the actuator housing comprises an axially-oriented threaded portion and the actuator adapter comprises a corresponding axially-oriented threaded portion so that the actuator housing is axially threadably coupled with the actuator adapter, wherein a force resulting from fluid pressure inside the actuator housing from the choke is restrained from separating the actuator housing from the actuator adapter by a strength of the threads in an axially-oriented shear direction across the threads.

BRIEF DESCRIPTION OF THE SEVERAL VIEWS OF THE DRAWINGS

FIG. 6 is a cross-sectional schematic top view of the actuator of FIGS. 3-5.

FIG. 7 is a cross-sectional schematic side view of the actuator of FIGS. 3-5.

FIG. 8 is a cross-sectional schematic end view of the actuator of FIGS. 3-5.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The disclosure provides a choke with an actuator that contains various components within an actuator housing to adjust the choke, and the housing is configured to be fixedly attached with a relatively large shearing connection on an actuator adapter to resist large overpressure surges within the housing and around the components. The actuator further includes a thrust bearing mounted adjacent a shoulder in the housing and supporting a worm gear, so that any overpressure loads are directed to the shoulder of the housing and retained within the housing while the housing is retained by the shearing connection to the remainder of the choke.

Figure 1:
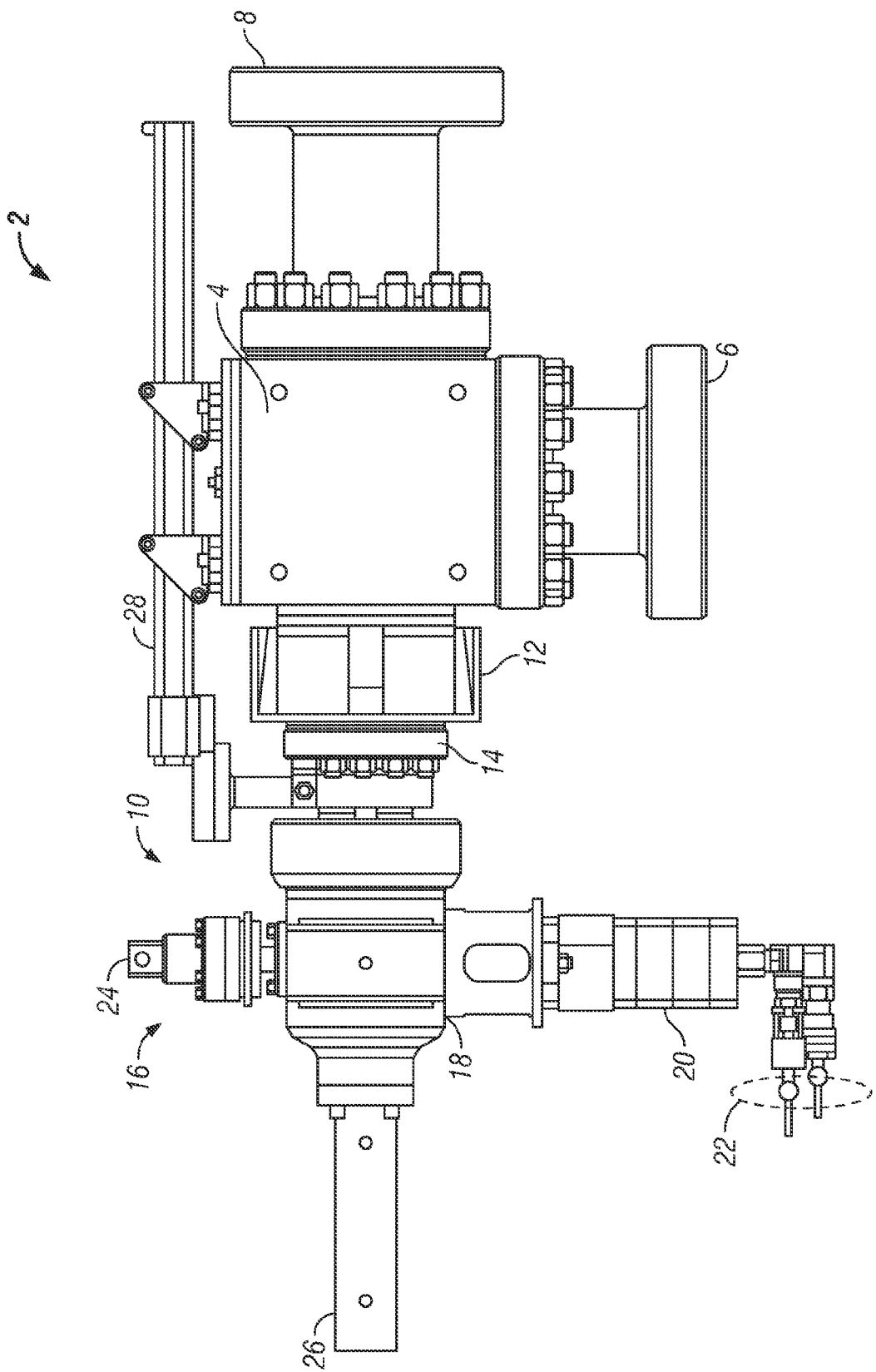
FIG. 1 is a side view schematic of an exemplary embodiment of a choke of the present invention.

FIG. 1 is a side view schematic of an exemplary embodiment of a choke of the present invention. The choke assembly 2 generally includes the choke housing 4 that contains a seat and associated components for adjusting a flow of fluids through the choke. The choke housing 4 is coupled to an inlet 6 and an outlet 8. The inlet 6 is generally coupled to a high-pressure source of fluid, such as a wellhead. The outlet 8 is generally coupled to downstream components. An actuator assembly 10 is coupled to the choke housing 4 through a bonnet nut 12. An actuator adapter 14 is coupled to the bonnet nut 12 on one end of the actuator adapter and to an actuator 16 on the other end. The actuator 16 includes an actuator housing 18 that houses various components of the actuator, described below. A motor 20 is coupled to the actuator housing and is supplied with power through one or more power lines 22. In at least one embodiment, the motor is a hydraulic motor and the power lines are hydraulic fluid lines. The actuator 16 further can include a hand wheel coupler 24 for coupling a manual hand wheel for backup actuation of the choke and other purposes. Further, the actuator 16 can include a position indicator 26 that can remotely indicate a position of a flow control component that controls flow through the choke. A gantry 28 can be coupled to the choke housing 4 and supports the actuator assembly 10 for assembly and disassembly operations.

Figure 2:
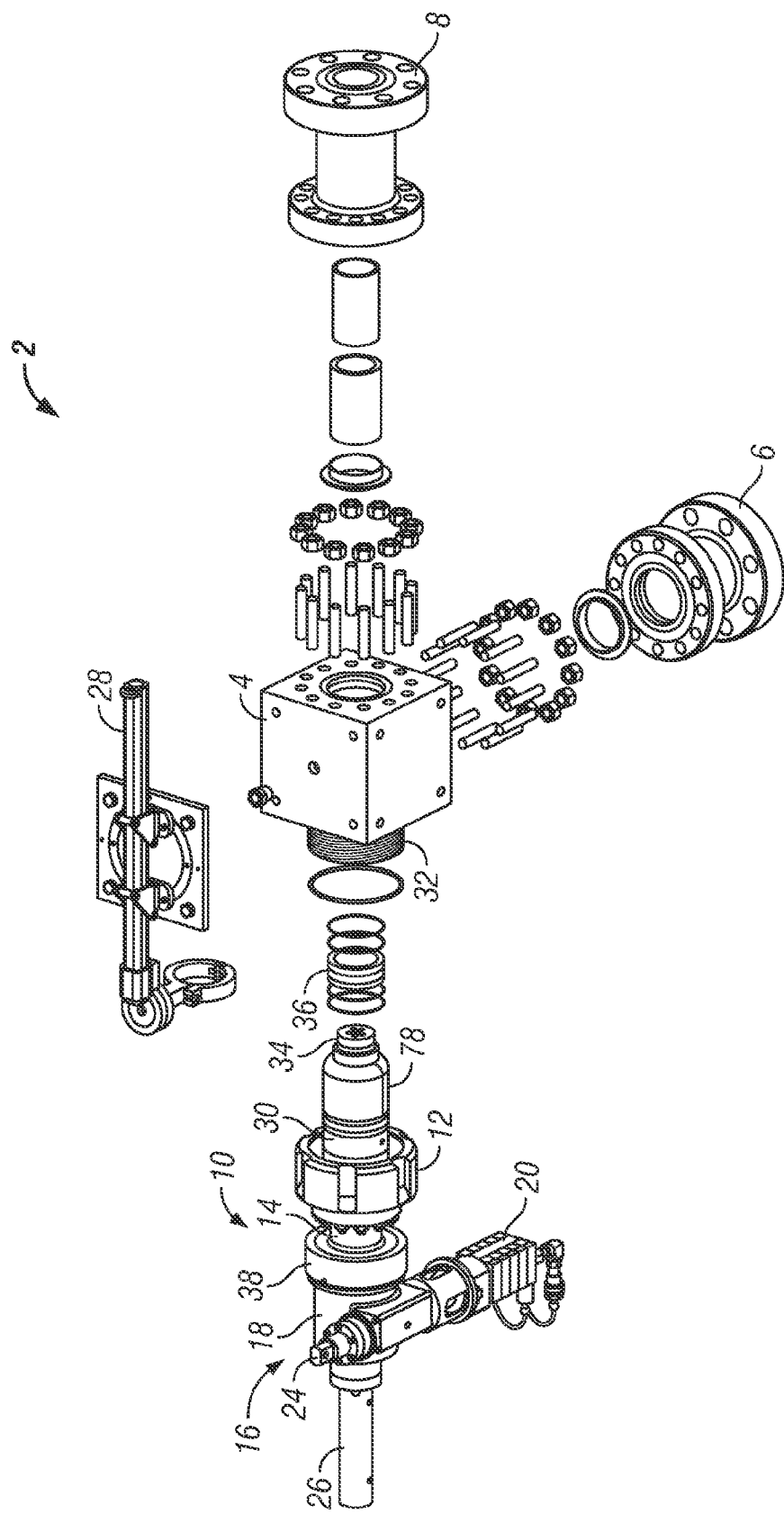
FIG. 2 is an expanded perspective schematic view of the choke of FIG. 1.

FIG. 2 is an expanded perspective schematic view of the choke of FIG. 1. The choke 2 is a collection of various components, detailed herein. Where not detailed, various other components include seals, glands, bearings, bolts, nuts, studs, wear surfaces, such as wear sleeves, packing, and the other components generally known to those with ordinary skill in the art and therefore are believed to not require detailed description herein. In the exemplary choke embodiment, the choke housing 4 includes various openings to receive studs to attach the inlet 6 and the outlet 8 thereto. Further, the choke housing 4 includes a threaded surface 32 to which the actuator assembly 10 can be coupled to the housing. The gantry 28 can also be coupled to the housing 4 to support the weight of the actuator assembly 10 for assembly and disassembly operations. A seat 36 is generally made from material resistive to eroding fluid flow, and is installed in the choke housing 4. A trim plug 34 interacts with the seat 36 to control the rate of flow through the choke housing 4. The actuator assembly 10 varies the position of the trim plug 34 relative to the fixed position of the seat 36, as will be described herein.

Further, the actuator assembly 10 includes an actuator 16 having an actuator housing 18. The actuator housing 18 has a portion termed herein an actuator housing connector 38. The actuator housing connector 38 provides a transition between the housing 18 and the actuator adapter 14. The actuator adapter 14 is threadably engaged with the actuator housing connector 38 on one end of the actuator adapter. The other end of the actuator adapter 14 is coupled to the bonnet nut 12 that in turn is coupled through the bonnet nut threads 30 to the choke housing threads 32. Other components coupled to the actuator 16 include the motor 20, used to drive the position of the trim plug 34 relative to the seat 36, and a hand wheel coupler 24. The position indicator 26 coupled to the housing 18 can indicate the position of the trim plug 34. A nose 78 is disposed partially within the bonnet nut 12 and provides a bore in which the trim plug 34 can axially slide left and right in the orientation shown in FIG. 2 relative to the seat 36.

Figure 3:
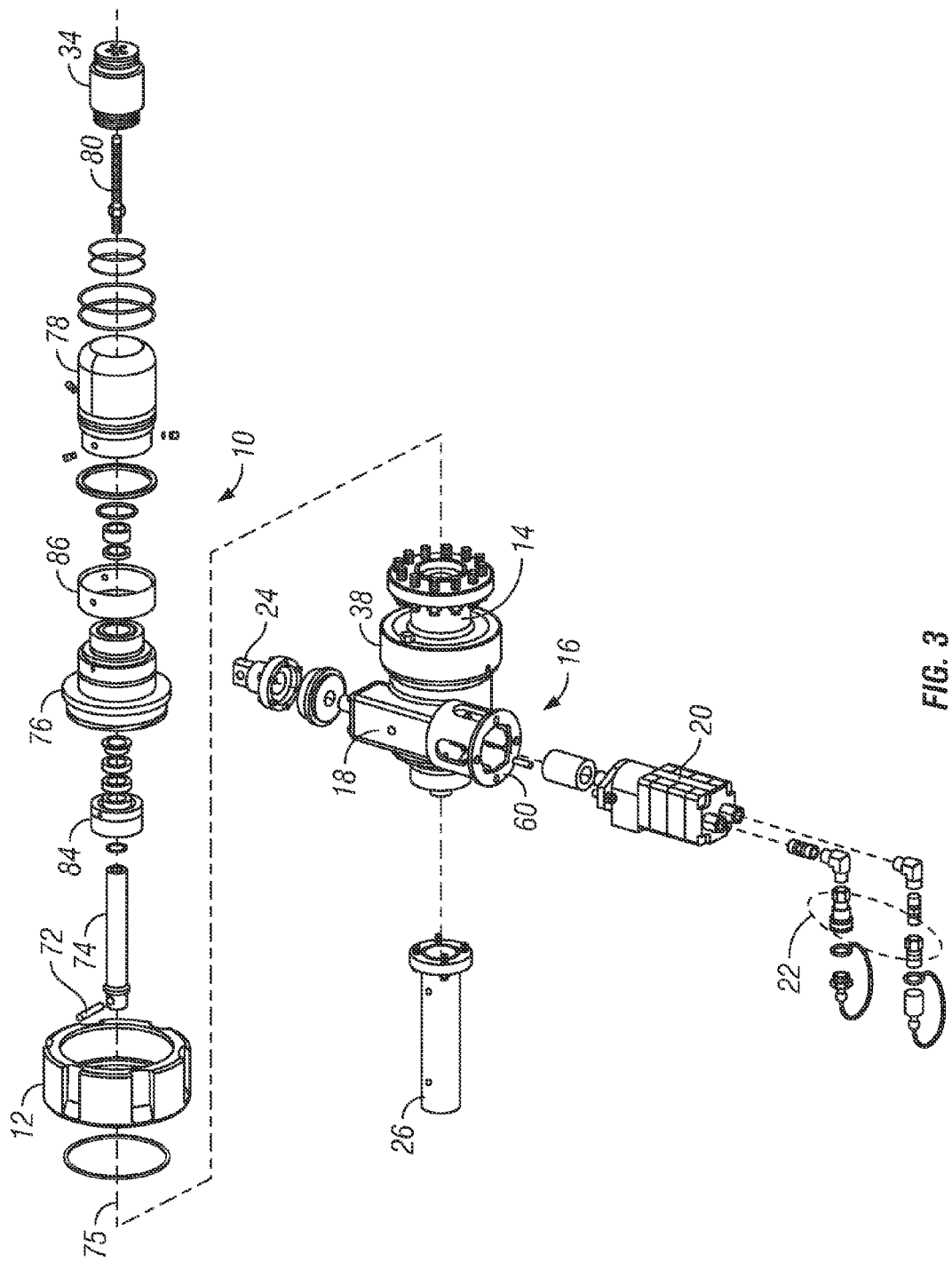
FIG. 3 is an expanded perspective schematic view of an actuator assembly of the choke of FIG. 2.

FIG. 3 is an expanded perspective schematic view of an actuator assembly of the choke of FIG. 2. Starting from the upper left corner of the Figure, the bonnet nut 12 provides a coupling means of attaching the actuator assembly 10 to the choke housing 4 described above. A stem 74 slides left and right along an axis of the actuator assembly in the orientation shown in FIG. 3 and varies the axial position of the trim plug 34. The stem 74 is coupled to a lift shaft described below by a hardened dowel pin 72. A bonnet nose 76 is dimensioned to fit within an inner bore of the bonnet nut 12 and support various components, such as seals, bearings, and a packing nut 84 therein. The nose 78 is coupled to the bonnet nose 76. A nose sleeve 86 surrounds the coupling area between the bonnet nose 76 and nose 78. The nose 78 has an inner bore that acts as a guide for the outer peripheral surface of the trim plug 34 as it traverses axially in the nose bore, that is, left and right in the orientation of the Figure. An intermediate short stem 80 is coupled on one end to the stem 74 and on the other end to the trim plug 34.

The actuator 16, further detailed below, includes an actuator adapter 14 to transition between the actuator 16 and the bonnet nut 12, described above. The actuator 16 includes the actuator housing 18 with the actuator housing connector 38 for threadably coupling to the actuator adapter 14. Further, the actuator 16 includes the motor 20 coupled to the power lines 22, a hand wheel coupler 24, and a position indicator 26.

Figure 4:
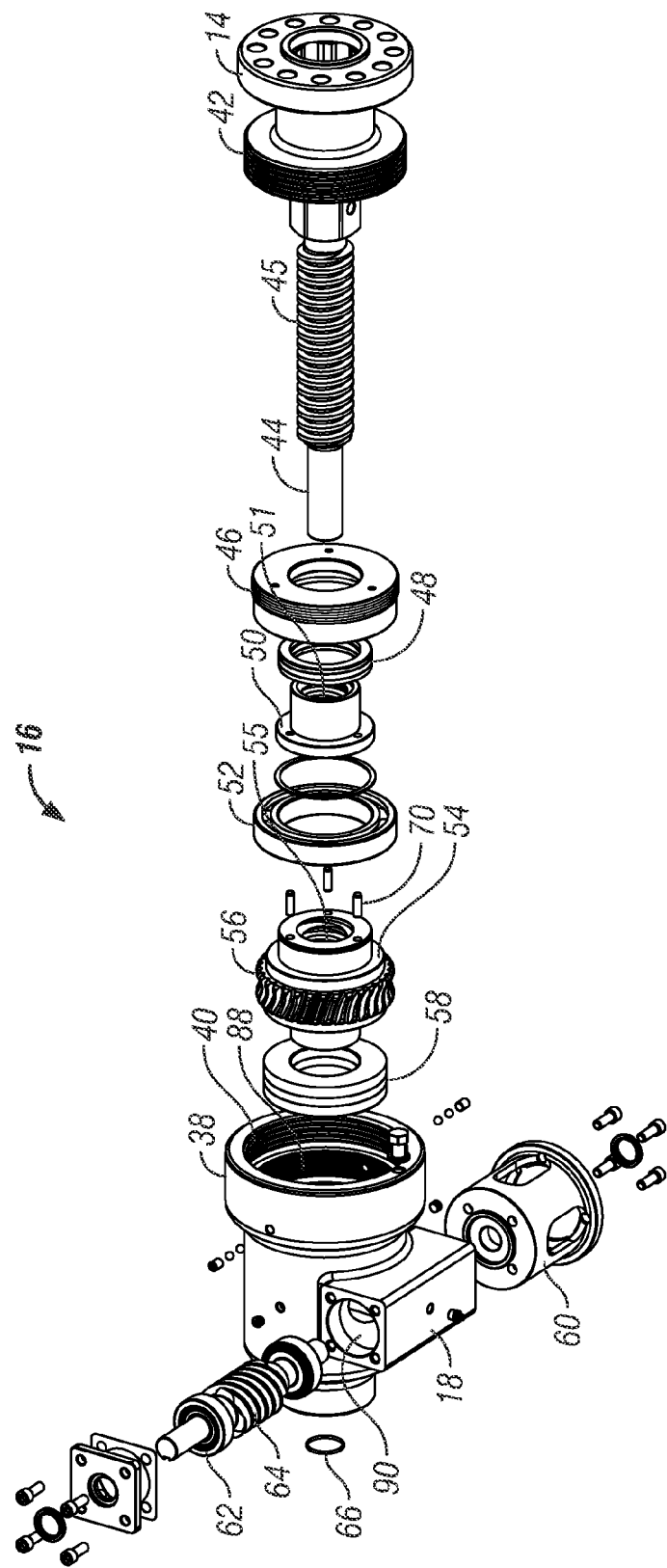
FIG. 4 is an expanded perspective schematic view of an actuator of the actuator assembly of FIG. 3.

FIG. 4 is an expanded perspective schematic view of an actuator of the actuator assembly of FIG. 3. The actuator 16 includes various components configured to move and retain the position of the trim plug 34 relative to the seat 36, described above. The actuator 16 includes the actuator housing 18 with an opening 88 into which various components described herein can be inserted and operated, while the housing opening 88 is closed when coupled with the actuator adapter 14.

The actuator housing 18 can be coupled with the adapter 14 by the actuator housing connector 38 having inner threads for coupling to outer teeth on the actuator adapter 14. More specifically, the actuator housing 18 comprises a portion with axially-oriented threads 40 (that is the threaded portion is directed along the axis 75 of the actuator assembly) and the actuator adapter 14 comprises a portion with corresponding axially-oriented threads 42, so that the actuator housing is axially threadably coupled with the actuator adapter. When a force resulting from fluid pressure inside the actuator housing from the choke occurs, the force is restrained from separating the actuator housing 18 from the actuator adapter 14 by strength of the mating threads in an axially-oriented shear direction across the threads. In other words, the mating threads would need to shear sideways across the cross-sections of the threads in the axial direction to allow the actuator housing to separate from the actuator adapter. This connection provides a much stronger connection that heretofore used in chokes. This connection has escaped the attention and efforts of those with ordinary skill in the art, even though chokes have been used for decades with the attendant safety challenges described above.

Starting from the right of FIG. 4, the actuator adapter 14 includes the axially-oriented threads 42, described above. A lift shaft 44, having lift shaft threads 45, is sized to be inserted through a backlash gland nut 46. The backlash gland nut 46 provides backlash adjustment and is a housing for bearings and/or seals to support the lift shaft 44. A thrust bearing 48 is sized to be inserted within the backlash gland nut 46 and has an inner bore sized to fit around a backlash nut 50 inserted therethrough. The backlash nut 50 has inner threads 51 configured to interact with the lift shaft threads 45 to assist in preventing unintended axial movement of the lift shaft 44 in conjunction with the backlash gland nut 46, for example, when a pressure surge occurs in the choke. A radial bearing 52 provides for radial support of a worm gear 54 by an inner bore of the radial bearing 52 axially fitting around a portion of the worm gear 54. The worm gear 54 includes inner threads 55 configured to interact with the lift shaft threads 45. The worm gear 54 also includes outer teeth 56 configured to interact with a worm gear described herein. A thrust bearing 58 is disposed on a distal side of the worm gear 54 from the radial bearing 52. The thrust bearing 58 is sized with an inner bore to axially fit around a portion of the worm gear 54. The back face of the thrust bearing fits on a shoulder, described below, inside the housing 18 to resist thrust loads on the actuator components during pressurized operation of the choke. In contrast to other efforts, the thrust bearing 58 supports the worm gear that transmits the torque to the lift shaft 44. In other efforts, the backlash nut 50 has been disposed adjacent a thrust bearing 58 and has supported against a thrust load, resulting in premature failure of the actuator 16 or parts thereof.

Further, the actuator 16 includes a worm drive unit. The worm drive includes a motor mount 60 for coupling to the motor 20, described above. A radial bearing 62 fits around a portion of a worm shaft 64 and a second bearing 66 fits around a second end of the worm shaft 64, so that the bearings support radial loads on the worm shaft as it interacts with the threads 45 on the lift shaft 44. The worm shaft 64 and associated bearings fit within an opening 90 in the actuator housing 18. The worm shaft 64 can be used to support the hand wheel coupler 24, described above.

Figure 5:
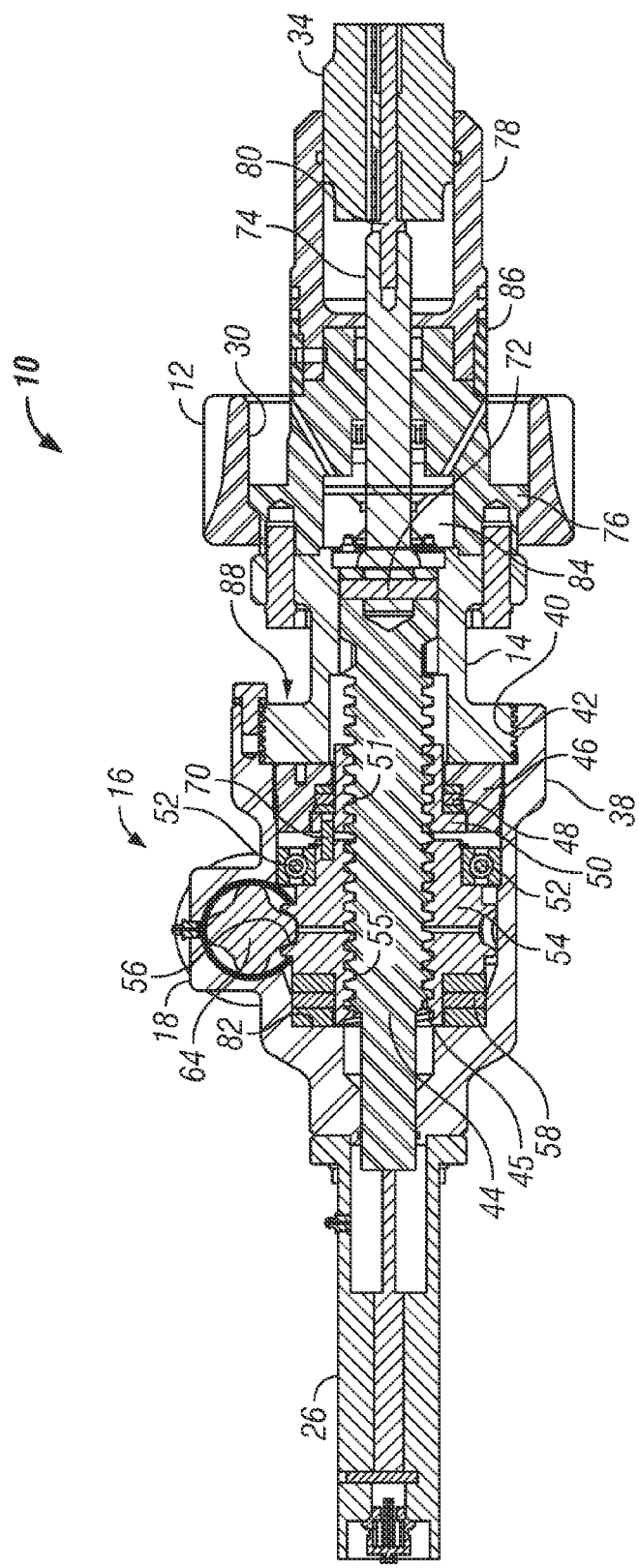
FIG. 5 is a cross-sectional schematic view of the actuator assembly of FIGS. 3-4.

FIG. 5 is a cross-sectional schematic view of the actuator assembly of FIGS. 3-4. FIG. 6 is a cross-sectional schematic top view of the actuator of FIGS. 3-5. FIG. 7 is a cross-sectional schematic side view of the actuator of FIGS. 3-5. FIG. 8 is a cross-sectional schematic end view of the actuator of FIGS. 3-5. The figures will be described in conjunction with each other. The actuator assembly 10 includes the bonnet nut 12, coupled to an actuator adapter 14 that in turn is coupled to the actuator 16. The actuator 16 includes a housing 18 that houses various components of a worm drive operably coupled to a lift shaft 44 for moving the lift shaft axially left and right in the orientation shown in the Figures. The movement of the lift shaft 44 in turn moves the stem 74 coupled to the lift shaft through a hardened dowel pin 72. The movement of the stem 74 moves the short stem 80 coupled thereto which in turn moves the trim plug 34. The trim plug 34 is variably positioned relative to the seat 36, described in FIG. 2, to control the flow through the choke 2 described therein.

More specifically, the bonnet nut 12 provides an opening in which a bonnet nose 76 can be inserted therein. A nose 78 can be coupled to the bonnet nose 76. The trim plug 34 can slidably engage an inner bore of the nose 78. The inner bore of the nose 78 and bonnet nose 76 allows the stem 74 to move axially left and right. A packing nut 84 can help seal an outer periphery of the stem 74 as it translates inside the bore of the bonnet nose 76. The bonnet nut 12 is coupled to the actuator adapter 14 by, for example and without limitation, studs, nuts, and bolts. An inner bore of the actuator adapter 14 is sized to allow the lift shaft 44 to translate axially left and right. The lift shaft 44 is coupled to the stem 74 by a hardened dowel pin 72. The other end of the actuator adapter, distal from the bonnet nut 12, is coupled to the actuator housing 18 of the actuator 16. In at least one embodiment, the coupling occurs through threads 40 of the actuator housing connector 38 mating with the threads 42 of the actuator adapter 14. The threaded connection provides a strong connection that would require shearing the threads at the joint to separate from the remainder of the actuator assembly 10.

A backlash gland nut 46 is disposed to the left of the actuator adapter 14 and inside the opening 88 of the housing 18. The backlash gland nut 46 has an inner bore sufficient for a thrust bearing 48 to fit against a shoulder of the backlash gland nut 46. A backlash nut 50 is disposed inside the inner bore of the thrust bearing 48. The backlash nut 50 is formed with backlash threads 51 that engage threads 45 on the lift shaft 44. The backlash nut 50 with its threads 51 help control unintended movement caused by a pressure surge in the choke. A worm gear 54 is disposed to the left of the backlash nut 50. The worm gear 54 is rotably coupled to the backlash nut 50 through one or more dowel pins 70. Thus, when the worm shaft 64 rotates the worm gear 54, the backlash nut 50 rotates consistent therewith. However, the backlash nut 50 is also axially adjustable relative to the worm gear 54, so that the tooth spacing between the threads 55 of the worm gear and threads 51 on the backlash nut can be adjusted relative to the threads 45 on the lift shaft 44 to prevent unnecessary axial movement of the shaft 44 when for example, thrust loads occur on the shaft. A radial bearing 52 is coupled to an outer periphery of the worm gear 54. The worm gear 54 includes inner threads 55 configured to interact with the threads 45 on the lift shaft 44. The worm gear 54 further includes outer teeth 56 configured to interact with threads on the worm shaft 64. A thrust bearing 58 is disposed to the left of the worm gear 54 and fits around an outer periphery of a portion of the worm gear. A shoulder 82 in the housing 18 supports the distal face of the thrust bearing 58. Further, the shoulder 82 is sufficiently sized to support in at least one embodiment, a portion of the worm gear 54 if the thrust bearing should fail.

The position indicator 26 is coupled to an end of the housing 18 distal from the actuator adapter 14 and is generally coupled to the lift shaft 44. The position indicator includes one or more components that are able to determine the position of the lift shaft 44 and provide indications of such position on-site or remote, or a combination thereof.

The worm shaft 64 can be rotated by the motor 20 described above that in turn rotates outer teeth 56 of the worm gear 54. When the worm gear 54 rotates, the inner threads 55 of the worm gear interact with the threads 45 of the lift shaft 44 and move the lift shaft 44 axially left or right. The backlash nut 50 with the threads 51 helps control unintended movement caused by clearances between the lift shaft threads 45 and the inner threads 55 of the worm gear. The translation left and right of the lift shaft 44 causes the stem 74, the short stem 80, and the trim plug 34 to also move left and right and thereby control flow through the choke.

Other and further embodiments utilizing one or more aspects of the inventions described above can be devised without departing from the spirit of the disclosed invention. Further, the various methods and embodiments of the system can be included in combination with each other to produce variations of the disclosed methods and embodiments. Discussion of singular elements can include plural elements and vice-versa. References to at least one item followed by a reference to the item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalent of the following claims.

The invention claimed is:

1. A choke for the oil and gas industry, comprising:
   a choke housing comprising an inlet and an outlet, and a seat disposed therein fluidly coupled to the inlet and the outlet;
   a bonnet nut coupled to the choke housing;
   an actuator adapter coupled to the bonnet nut;
   an actuator coupled to the actuator adapter, the actuator comprising an actuator housing;
   a lift shaft coupled to the actuator housing, the lift shaft having threads formed thereon;
   a worm gear coupled to the actuator housing and having inner threads and outer teeth, the inner threads configured to engage the lift shaft threads;
   a worm shaft coupled transverse to the worm gear, the worm shaft having threads configured to engage and turn the outer teeth of the worm gear; and
   the choke being configured to axially move the lift shaft with the worm shaft and vary a location of a trim plug relative to the seat to adjust a flow through the choke;
   wherein the actuator housing comprises an axially-oriented threaded portion and the actuator adapter comprises a corresponding axially-oriented threaded portion so that the actuator housing is axially threadably coupled with the actuator adapter, wherein a force resulting from fluid pressure inside the actuator housing from the choke is restrained from separating the actuator housing from the actuator adapter by a strength of the threads in an axially-oriented shear direction across the threads.

2. The choke of claim 1, further comprising a backlash nut rotationally coupled to the worm gear and having inner threads configured to engage the lift shaft threads, the backlash nut being axially adjustable relative to the worm gear.

3. The choke of claim 1, further comprising a thrust bearing disposed between a portion of the worm gear and a shoulder on the actuator housing and configured to support a thrust load on the worm gear from the choke inlet or outlet to the actuator housing.

4. The choke of claim 1, wherein the lift shaft is coupled to a stem and the stem is coupled to the trim plug.

5. The choke of claim 1, further comprising a position indicator coupled to the lift shaft.

* * * * *